United States Patent
Shiraishi et al.

[15] 3,687,911

[45] Aug. 29, 1972

[54] PROCESS FOR THE PRODUCTION OF OLEFINIC RUBBERY COPOLYMERS OF MODIFIED MOLECULAR WEIGHT

[72] Inventors: Masao Shiraishi; Kiyoshi Maeda, both of Yokkaichi, Japan

[73] Assignee: Mitsubishi Petrochemical Co., Ltd., Tokyo, Japan

[22] Filed: Sept. 24, 1970

[21] Appl. No.: 75,296

[30] Foreign Application Priority Data

Sept. 27, 1969 Japan ...................... 44/76581

[52] U.S. Cl. ........260/80.78, 260/88.2 R, 252/429 B
[51] Int. Cl. ............................................C08f 15/40
[58] Field of Search ..........260/99.9 CD, 88.2, 80.78; 252/429 B

[56] References Cited

UNITED STATES PATENTS 3,293,230  12/1966  Coover .................... 260/93.7

Primary Examiner—Joseph L. Schofer
Assistant Examiner—Roger S. Benjamin
Attorney—Sherman and Shalloway

[57] ABSTRACT

A process for copolymerizing either ethylene with a $C_3$ or above alpha-olefin or ethylene with a $C_3$ or above alpha-olefin and an unconjugated diene in the presence of a Ziegler catalyst for polymerization of olefins, consisting of a transition metal compound component and an organoaluminum compound component, as well as in the copresence of a molecular modifier to produce an olefinic rubbery copolymer, the improvement wherein the copolymerization reaction is carried out in the copresence of an epoxy fatty acid ester as the molecular weight modifier.

10 Claims, No Drawings

PROCESS FOR THE PRODUCTION OF OLEFINIC RUBBERY COPOLYMERS OF MODIFIED MOLECULAR WEIGHT

This invention relates to an improved process for the production of olefinic rubbery copolymers of modified molecular weight and, in particular, to such a process wherein not only an excellent molecular weight modifying effect is demonstrated with the use of the molecular weight modifier in a markedly reduced amount as compared with proposals made heretofore, but also the object of molecular weight modification is achieved with substantially no decline in the yield of the resulting copolymer, as well as without imposing any restrictions or the known polymerization operation itself.

More specifically, the invention relates to a process wherein in copolymerizing either ethylene with a $C_3$ or above alpha-olefin or ethylene with a $C_3$ or above alpha-olefin and an unconjugated diene in the presence of a Ziegler catalyst for polymerization of olefins, consisting of a transition metal compound component and an organoaluminum compound component, as well as in the copresence of a molecular weight modifier to produce an olefinic rubbery copolymer, the copolymerization reaction is carried out in the presence of an epoxy fatty acid ester as the molecular weight modifier.

The production of olefinic rubbery copolymers by copolymerizing either ethylene with a $C_3$ or above alpha-olefin or ethylene with a $C_3$ or above alpha-olefin and further an unconjugated diene in the presence of the so-called Ziegler catalyst for polymerization of olefins, consisting of a transition metal compound component and an organoaluminum compound component, and the procedure of causing the copresence in the polymerization system of a molecular weight modifier to serve in the modification of the molecular weight are already known.

As procedures of utilizing a molecular weight modifier in this manner, known are such methods as that wherein the polymerization reaction is carried out in the copresence of hydrogen by introducing same into the polymerization system and that wherein the polymerization reaction is carried out in the copresence of molecular weight modifiers such as amines as tri-n-butylamine and ethyl bromide and diethyl zinc.

However, the utilization of a molecular weight modifier generally poses a problem in that difficulty is experienced in achieving compatibility between the molecular weight modification effect and the amount of the modifier used for achieving the desired effect and/or yield of the polymer.

For example, when hydrogen is used as the molecular weight modifier, of the gas fed, only that portion which dissolves in the solvent and monomer serves directly for achieving the molecular weight modifying effect. Thus, the efficiency is poor as compared with the amount of the molecular weight modifier used. Further, since a considerable amount leaves to the outside of the system along with the unreacted gas without becoming dissolved, necessary equipment for recovering and reusing same must be provided. Again, in case of the other modifiers also, if a satisfactory molecular weight modifying effect is to be achieved, the amount used must become comparatively large. On the other hand, the tendency to a decline in the yield of the polymer cannot be avoided, if the amount used becomes comparatively great. Again, in some cases the molecular weight modifier is unsatisfactory in that it is one which is either not readily available or expensive.

As a result of our research with a view to solving this problem of incompatibility, we found that by carrying out the reaction for the production of the aforesaid olefinic rubbery copolymers in the copresence in the copolymerization system of an epoxy fatty acid ester— a compound which has not heretofore been proposed at all as a molecular weight modifier—not only the molecular weight of the resulting copolymer can be freely modified with the use of a relatively small amount of this modifier, but also the decline in yield was slight.

Accordingly, an object of the present invention is to provide a process for producing olefinic rubbery copolymers of modified molecular weight wherein not only an excellent molecular weight modifying effect is demonstrated with the use of the molecular weight modifier in a markedly reduced amount as compared with the proposals made heretofore, but also the object of molecular weight modification is achieved with substantially no decline in the yield of the resulting copolymer.

Other objects and advantages of the invention will become apparent from the following description.

The $C_3$ or above alpha-olefins used in the invention process are those alpha-olefins which are known to form olefinic rubbery copolymers either by copolymerizing with ethylene or by copolymerizing with ethylene and an unconjugated diene. These alpha-olefins can be used singly or in combinations of a plurality thereof. The $C_3$–$C_{10}$ alpha-olefins are preferably used. Included are such, for example, as propylene, butene-1, pentene-1, hexene-1, heptene-1, octene-1, isobutylene, 5-methyl-pentene-1, nonene-1, decene-1, 5-methyl-1-nonene, 5,5-dimethyl-1-octene, 4-methyl-1-hexene, 5-methyl-1-hexene, 5-methyl-1-heptene, 4-methyl-1-heptene, 6-methyl-1-heptene and 4,4-dimethyl-1-pentene.

On the other hand, as the unconjugated diene, all those unconjugated dienes which are used in this type of copolymerization reaction for rendering the copolymer vulcanizable can be used. Those conveniently useable include such, for example, as 5-ethylidene-2-norbornene, 1,4-hexadiene, dicyclopentadiene, methyltetrahydroindene and 5-methylene 2-norbornene.

The amount in which these comonomers are used will also depend on the class of the $C_3$ or above olefins used and can be suitably varied within the range wherein olefinic rubbery copolymers can be formed. Generally speaking, the amount of the $C_3$ or above alpha-olefins used based on the ethylene in the copolymer formed is on the order of 10–80 mol percent, and preferably on the order of 30–60 mol percent.

Again, the amount of the unconjugated dienes used can also be varied, and the amount of the unconjugated dienes in the copolymer formed is on the order 0.6–4 mol percent hand on the amount of ethylene, and preferably on the order of 0.9–2.5 mol percent.

Further, the catalyst to be used in the copolymerization reaction is the well-known Ziegler catalyst, which is used for polymerizing of olefins. In the invention process the catalyst composed of a transition metal compound component and an organoaluminum compound component is used.

As the transition metal compound component of the catalyst, the compounds of titanium or vanadium, and preferably the compounds of vanadium, can be used. The halides of vanadium and the alkyl vanadates are preferred. As such vanadium compounds, mention can be made of such, for example, as vanadium oxytrichloride, vanadium tetrachloride, vanadium trichloride, triethylvanadate, vanadium acetylacetonate, vanadium tetrabromide, vanadium tribromide, and the like. Also in the case of the organoaluminum compounds the known catalyst components such as trialkylaluminums, dialkylaluminum monohalides, alkylaluminum dihalides and alkylaluminum sesquihalides can be used. As the alkyl in the hereinabove mentioned compounds, preferred are the $C_1$-$C_8$ alkyl groups, while as the halogen, preferred is chloride.

The amount of catalyst to be used, the polymerization temperature as well as other polymerization conditions and operation are well known. Thus, the known conditions and operating procedures can be suitably employed. For examples, the amount of the catalyst used in a molar ratio of aluminum compound/transition metal compound is 3–10:1 and, as the concentration of the transition metal compound, the use of conditions on the order of 0.02–0.1 grams per liter of solvent is most common. As regards the polymerization temperature and pressure, frequently used are, for example, those ranging on the order of $-20°$ to $70°C$. and 1–25 kg/cm$^2$.

In the invention process, as hereinbefore indicated, an epoxy fatty acid ester is used as the molecular weight modifier. As shown by the hereinafter given control experiments, the objects of the present invention cannot be achieved by the use of the ethers having an epoxy group or the like, such, for example, as phenylglycidyl ether, butylglycidyl ether and glycidol.

As the molecular weight modifier to be used in the invention process, preferred are those epoxy fatty acid esters whose number of carbon atoms of the fatty acid portion is 1–20 and number of carbon atoms of the ester portion is 1–10, particularly preferred being those having 1–18 carbon atoms in the fatty acid portion and 1–10 carbon atoms in the ester portion. These epoxy fatty acid esters can either be used singly or be used as a mixture of a plurality of classes thereof.

As such epoxy fatty acid esters can be mentioned such, for example, as propyl epoxy palmitate, butyl epoxy palmitate, pentyl epoxy palmitate, hexyl epoxy palmitate, propyl epoxy stearate, butyl epoxy stearate, pentyl epoxy stearate, actyl epoxy stearate, epoxidized oleic acid glyceride, glycidyl butylate, glycidyl laurate, glycidyl palmitate, glycidyl stearate, glycidyl succinate and glycidyl adipate.

While the amount of the epoxy fatty acid ester used will vary depending upon the classes of the comonomers and unconjugated dienes, the molar ratio in which they are used to ethylene, the class of catalyst, the amount of catalyst used and the class of the epoxy fatty acid ester, usually an amount ranging on the order of 0.005–3.0 mols per each mol of the organoaluminum compound catalyst component is sufficient. Generally, a fully satisfactory molecular weight modifying effect is achieved with a minimal amount, i.e., a small quantity on the order of 0.01–1.0 mol, and preferably 0.02–0.8 mol.

The amount used, as hereinabove indicated, is, for example, on the order of 1/4-fold molar quantity of that required when using the conventional molecular weight modifiers such as amines and corresponds to less than about one-half in terms of weight.

In the invention process, the conventional molecular weight modifier, e.g., hydrogen can be conjointly used, if desired, but this is, of course, not necessary.

According to the invention process, the Mooney viscosity ($ML_{1+8}^{120°\,C.}$) of the resulting copolymer can be optionally adjusted within the range of about 10–120 by suitably adjusting the amount of the epoxy fatty acid ester added within the range hereinbefore indicated.

While no particular restrictions are imposed as to the method of accomplishing the copresence in the reaction system of the molecular weight modifier in carrying out the invention process, it is preferred from the standpoint of the molecular weight modifying effect obtained and the catalytic yield [yield (g) of polymer per unit gram of transition metal compound (g-polymer/g-transition metal compound)] that the copresence is effected by first contacting the ester with the aforesaid organoaluminum catalyst component followed by bringing it into contact with the aforesaid transition metal catalyst component.

For example, the preferred procedure is to either mix and contact the organoaluminum catalyst component and the epoxy fatty acid ester in advance and then introduce the mixture to the reaction zone or introduce the two components to the reaction zone independently of each other either simultaneously or in an optional order, ad thereafter add and contact the transition metal catalyst component.

The so obtained copolymer, excelling particularly in such properties as weatherability, resistance to ozone and heat resistance, finds wide use in the various fields where rubber is used.

For this purpose, in carrying out its usual vulcanization with sulfur, carbon black, retarding oil, vulcanization agent, vulcanizing accelerator, zinc white and stearic acid are added.

The following examples are given for illustrating several modes of practicing the invention.

EXAMPLES I AND II AND COMPARISONS I–IX

A 3-liter glass flask equipped with an inlet line for the monomeric gas mixture, a discharge line, a thermometer and a stirrer was purged with nitrogen, after which it was charged with 1,500 ml of dehydrated hexane. Next, a combined solution of a 7.5 weight percent hexane solution of 1.13 grams of ethylaluminum sesquichloride and a 2.0 weight percent hexane solution of the prescribed amount of epoxidized oleic acid glyceride (molecular weight 960 ) was added, followed by the introduction and dissolving to saturation in hexane with gentle stirring of 3.0 liter per minute of ethylene and 8.0 liter per minute of propylene. While continuing the introduction of the monomers (ethylene and propylene), 3 ml of 5-ethylidene norbornene were added, followed by the addition of 0.114 gram of vanadium oxytrichloride to initiate the polymerization reaction. The polymerization temperature was held at 20°C.

After carrying out the polymerization reaction for 30 minutes, the feed of ethylene and propylene was stopped, and the polymerization reaction was terminated by adding 600 ml of water to the reaction mixture. At the same time, an age resister (styrenated phenol) was added, followed by thorough stirring of the liquid mixture of hexane and water wherein were dissolved the ethylene-propylene-ethylidene norbornene ternary copolymer to remove the residual catalyst portion. Next, the liquid mixture was allow to stand thereby separating and recovering a copolymer solution, which was then submitted to the usual steam stripping and vacuum drying operations to obtain a solid copolymer. The yield of this copolymer, its Mooney viscosity at 120°C., propylene content and iodine number were measured.

The foregoing experiment was carried out while using the epoxidized oleic acid glyceride in the varying amounts of respectively 0, 0.20 and 0.40 gram. The results obtained are shown in Table 1, below.

for the use of the conventional molecular weight modifiers, are also shown together.

EXAMPLES IV–IX AND COMPARISON XII

A 3-liter flask identical to that used in Example I was charged with 1,500 ml of dehydrated hexane with stirring, after which 1.13 grams of ethylaluminum sesquichloride was added. This was followed by the addition in the prescribed amount of epoxydized oleic acid glyceride (molecular weight 960). Next, 2.8 liters per minute of ethylene, 8.2 liters per minute of propylene and 0.3 liter per minute of hydrogen were introduced and dissolved to saturation in hexane. Then, after adding 3 ml of 5-ethylidene norbornene, 0.114 gram of vanadium oxytrichloride was added to initiate the polymerization reaction. The polymerization reaction was carried out for 30 minutes while holding the polymerization temperature at 20°C.

This was followed by treating the reaction mixture as in Example I to obtain a solid copolymer. The yield, Mooney viscosity at 120°C., propylene content and iodine number were measured.

The foregoing experiment was carried out using the epoxidized oleic acid glyceride in the amounts of

TABLE 1

| | Molecular weight modifier | | | Resulting rubbery copolymer | | | |
|---|---|---|---|---|---|---|---|
| No. | Class | Amount added (g.) | Molar ratio To organo-aluminum compound catalyst component | Yield (g.) | ML 120/ C. 1+8 | Propylene content (wt. percent) | Iodine number |
| Control | | | | 48 | 105 | 55 | 14.9 |
| Example I | Epoxidized oleic acid glyceride | 0.2 | 0.045 | 49 | 60 | 56 | 15.5 |
| Example II | do | 0.4 | 0.09 | 46 | 35 | 57 | 16.0 |
| Control I | Phenyl glycidyl ether [1] | 0.2 | 0.28 | 12 | (4) | 52 | 15.5 |
| Control II | do | 0.4 | 0.56 | 5 | do | 50 | 16.0 |
| Control III | do | 0.1 | 0.14 | 25 | 88 | 60 | 15.1 |
| Control IV | Butyl glycidyl ether [2] | 0.2 | 0.32 | 14 | (4) | 54 | 15.7 |
| Control V | do | 0.4 | 0.64 | 6 | do | 49 | 16.2 |
| Control VI | do | 0.1 | 0.16 | 29 | 79 | 47 | 15.2 |
| Control VII | Glycidol [3] | 0.1 | 0.3 | 37 | 107 | 57 | 15.1 |
| Control VIII | do | 0.3 | 0.9 | 34 | 107 | 56 | 15.2 |
| Control IX | do | 0.4 | 1.2 | 29 | 80.5 | 57 | 15.8 |

[1] 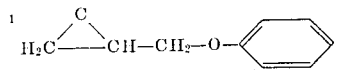

[2] 

[3] 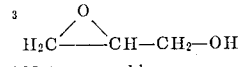

[4] Not measurable.

EXAMPLES III AND COMPARISONS X—XI

The experiments were operated exactly as in Examples I and II, except that the class and amount used of the molecular weight modifier were varied. The results obtained are shown in Table 2, below.

respectively 0, 0.15, 0.25 and 0.45 gram. The results thus obtained, the results obtained when the experiment was otherwise carried out in identical manner but the hydrogen was not used, and the results of comparison experiments wherein the molecular weight

TABLE 2

| | Molecular weight modifier | | | Resulting rubbery copolymer | |
|---|---|---|---|---|---|
| No. | Class | Amount added (g.) | Molar ratio to organo-aluminum compound catalyst component | Yield (g.) | ML120° C 1+8. |
| Control | | | | 48 | 105 |
| Example III | Octyl epoxy stearate | 1.4 | 0.8 | 36 | 8 |
| Control X | Tri-n-butylamine | 1.4 | 1.65 | 12 | (1) |
| Control XI | do | 2.8 | 3.3 | 8 | (1) |

[1] Not measurable due to irregularity of sample.

By way of comparison, results of comparison experiments, which were carried out in like manner except modifier used in the invention was not used but only hydrogen was fed are shown together in Table 3.

TABLE 3

| No. | Amount added of epoxidized oleic acid glyceride (g.) | Amount of hydrogen used (l./min.) | Copolymer | | |
|---|---|---|---|---|---|
| | | | Yield (g.) | ML 120° C. 1+8 | Propylene content (wt. percent) | Iodine number |
| Control | | | 42 | 100 | 64 | 14.0 |
| Example IV | 0.15 [0.034] | 0.3 (saturation) | 38 | 77 | 63 | 14.4 |
| Example V | 0.15 [0.034] | | 39 | 82 | 63 | 14.2 |
| Example VI | 0.25 [0.0565] | 0.3 (saturation) | 40 | 66 | 63 | 14.3 |
| Example VII | 0.25 [0.0565] | | 40 | 72 | 64 | 14.3 |
| Example VIII | 0.45 [0.101] | 0.3 (saturation) | 37 | 8 | 65 | 13.9 |
| Example IX | 0.45 [0.101] | | 35 | 9 | 64 | 14.2 |
| Example XII | | 0.3 (saturation) | 41 | 96 | 64 | 14.1 |

NOTE.—The figures in the brackets in the table indicate the molar ratio to organoaluminum compound catalyst component.

EXAMPLES X–XIII

The polymerization reactions were carried out as in Example I except that butyl epoxy stearate and octyl epoxy stearate were used as the molecular weight modifier. The yield of the so obtained copolymers, their Mooney viscosity at 120°C propylene content and iodine number were measured.

The results obtained are shown in Tables 4 and 5.

Table 4

| No. | amt. added of Butyl epoxy Stearate (g) | Properties of Crude Rubber | | | Yield (g) |
|---|---|---|---|---|---|
| | | 120°C ML 1+8 | Propylene Content (wt %) | Iodine Number | |
| Control | 0 | 101 | 62 | 15.0 | 42 |
| Ex. X | 0.10 [0.060] | 82 | 61 | 14.6 | 40 |
| Ex. XI | 0.40 [0.24] | 52 | 63 | 14.8 | 38 |

Note. — The figure in the brackets indicate the molar ratio to the organoaluminum compound catalyst component.

Table 5

| No. | amt. added of Butyl epoxy Stearate (g) | Properties of Crude Rubber | | | Yield (g) |
|---|---|---|---|---|---|
| | | 120°C ML 1+8 | Propylene Content (wt %) | Iodine Number | |
| Control | 0 | 101 | 62 | 15.0 | 42 |
| Ex. XII | 0.10 [0.057] | 80 | 62 | 15.3 | 41 |
| Ex. XIII | 0.70 [0.40] | 24 | 61 | 14.8 | 36 |

Note.— The figures in the bracket indicate the molar ratio to the organoaluminum compound catalyst component.

We claim:

1. In a process for copolymerizing either ethylene with a $C_3$ or above alpha-olefin or ethylene with a $C_3$ or above alpha-olefin and an unconjugated diene in the presence of a Ziegler catalyst for polymerization of olefins, consisting of a vanadium or titanium compound component and an organoaluminum compound component, as well as in the copresence of a molecular modifier to produce an olefinic rubbery copolymer, the improvement which comprises carrying out said copolymerization reaction in the copresence of an epoxy fatty acid ester, wherein the fatty acid portion contains 1–20 carbon atoms and the ester portion contains 1–10 carbon atoms, as the molecular weight modifier, said epoxy fatty acid ester being present in an amount of from 0.005 to 3.0 mols per mol of said organoaluminum compound component.

2. The process of claim 1 wherein the copresence of said epoxy fatty acid ester is carried out by first contacting said ester with said organoaluminum compound component and thereafter with said vanadium or titanium compound component.

3. The process of claim 1 wherein said epoxy fatty acid ester is selected from the group consisting of propyl epoxy palmitate, butyl epoxy palmitate, pentyl epoxy palmitate, hexyl epoxy palmitate, propyl epoxy stearate, butyl epoxy stearate, pentyl epoxy stearate, octyl epoxy stearate, epoxidized oleic acid glyceride, glycidyl butylate, glycidyl laurate, glycidyl palmitate, glycidyl stearate, diglycidyl succinate and diglycidyl adipate.

4. The process of claim 1 wherein said $C_3$ or above alpha-olefin is a $C_3$–$C_{10}$ alpha-olefin.

5. The process according to claim 4 wherein said $C_3$ or above alpha-olefin is a member selected from the group consisting of propylene, butene-1, pentene-1, hexene-1, heptene-1, octene-1, isobutylene, 5-methylpentene-1, nonene-1, decene-1, 5-methyl-1-nonene, 5,5-dimethyl-1-octene, 4-methyl-1-hexene, 5-methyl-1-hexene, 4-methyl-1-heptene, 5-methyl-1-heptene, 6-methyl-1-heptene and 4,4-dimethyl-1-pentene.

6. The process of claim 1 wherein said unconjugated diene is a member selected from the group consisting of 5-ethylidene-2-norbornene, 1,4-hexadiene, dicyclopentadine, methyl tetrohydroindene and 5-methylene-2-norbornene.

7. The process of claim 1 wherein an amount of said $C_3$ or above alpha-olefin in said copolymer is 10–80 mol percent based on the amount of ethylene.

8. The process of claim 1 wherein the amount of said unconjugated diene in said copolymer is 0.6–4 mol percent based on the amount of ethylene.

9. The process of claim 1 wherein said vanadium component is selected from the group consisting of the halides of vanadium and alkyl vanadates.

10. The process of claim 1 wherein said organoaluminum compound component is selected from the group consisting of trialkylaluminums, dialkylaluminum monohalides, alkylaluminum dihalides and alkylaluminum sesquihalides.

* * * * *